US012670043B2

(12) United States Patent
Palanivel et al.

(10) Patent No.: US 12,670,043 B2
(45) Date of Patent: Jun. 30, 2026

(54) SYSTEMS AND METHODS FOR API FORGE ACCELERATOR

(71) Applicant: CVS Pharmacy, Inc., Woonsocket, RI (US)

(72) Inventors: Dinesh Prabhu Palanivel, Woonsocket, RI (US); Debadipta Basu, Woonsocket, RI (US); Srikant Rajagopalan, Woonsocket, RI (US); Hemalatha Ravishankar, Woonsocket, RI (US); Reema Sharma, Woonsocket, RI (US); Rinu G. Dhanaraj, Woonsocket, RI (US); Gabriel Ferreri, Woonsocket, RI (US); Utkarsh Gaur, Woonsocket, RI (US); Michael Tripp, Woonsocket, RI (US); Siddharth Dubey, Woonsocket, RI (US); Yanay Ibanez, Woonsocket, RI (US); Rohith Yeedulapalli, Woonsocket, RI (US); Brad Cain, Woonsocket, RI (US); Anubha Gaur, Woonsocket, RI (US); Wade Prestridge, Woonsocket, RI (US)

(73) Assignee: CVS Pharmacy, Inc., Woonsocket, RI (US)

( * ) Notice: Subject to any disclaimer, the term of this patent is extended or adjusted under 35 U.S.C. 154(b) by 495 days.

(21) Appl. No.: 18/241,036

(22) Filed: Aug. 31, 2023

(65) Prior Publication Data

US 2025/0077323 A1 Mar. 6, 2025

(51) Int. Cl.
*G06F 9/54* (2006.01)
*G06F 8/20* (2018.01)

(52) U.S. Cl.
CPC ................ *G06F 9/547* (2013.01); *G06F 8/22* (2013.01)

(58) Field of Classification Search
CPC ...... G06F 9/541; G06F 9/547; G06F 11/3684; G06F 11/3664; G06F 11/3688; H04L 67/025; H04L 12/2818
See application file for complete search history.

(56) References Cited

U.S. PATENT DOCUMENTS 9,442,700 B2* 9/2016 Sarid ....................... G06F 9/547
2022/0206771 A1* 6/2022 Subramanian ............ G06F 8/10

\* cited by examiner

*Primary Examiner* — Andy Ho
(74) *Attorney, Agent, or Firm* — Leydig, Voit & Mayer, Ltd.

(57) ABSTRACT

In some examples, a method for developing an application programming interface (API) is provided. The method is performed by a computing system running an API Forge Accelerator. The method comprising: receiving, by the API Forge Accelerator, a request for generating an API for a service based on a type of a first gateway, wherein the request indicates a selection of the first gateway among a plurality of gateways integrated with the API Forge Accelerator; generating, by the API Forge Accelerator, based on the specific gateway, a specification template corresponding to the specific gateway for generating the API, wherein the specification template indicates specification information that is used for the API generation; obtaining, by the API Forge Accelerator, based on the specification template, specification information from user input and API tools; and generating, by the API Forge Accelerator, based on the specification information, the API for the service.

20 Claims, 12 Drawing Sheets

100

202

Processor ~ 204

ROM ~ 206

RAM ~ 208

Storage ~ 210

Network Interface ~ 212

Bus

200

300

380

Figure 4:
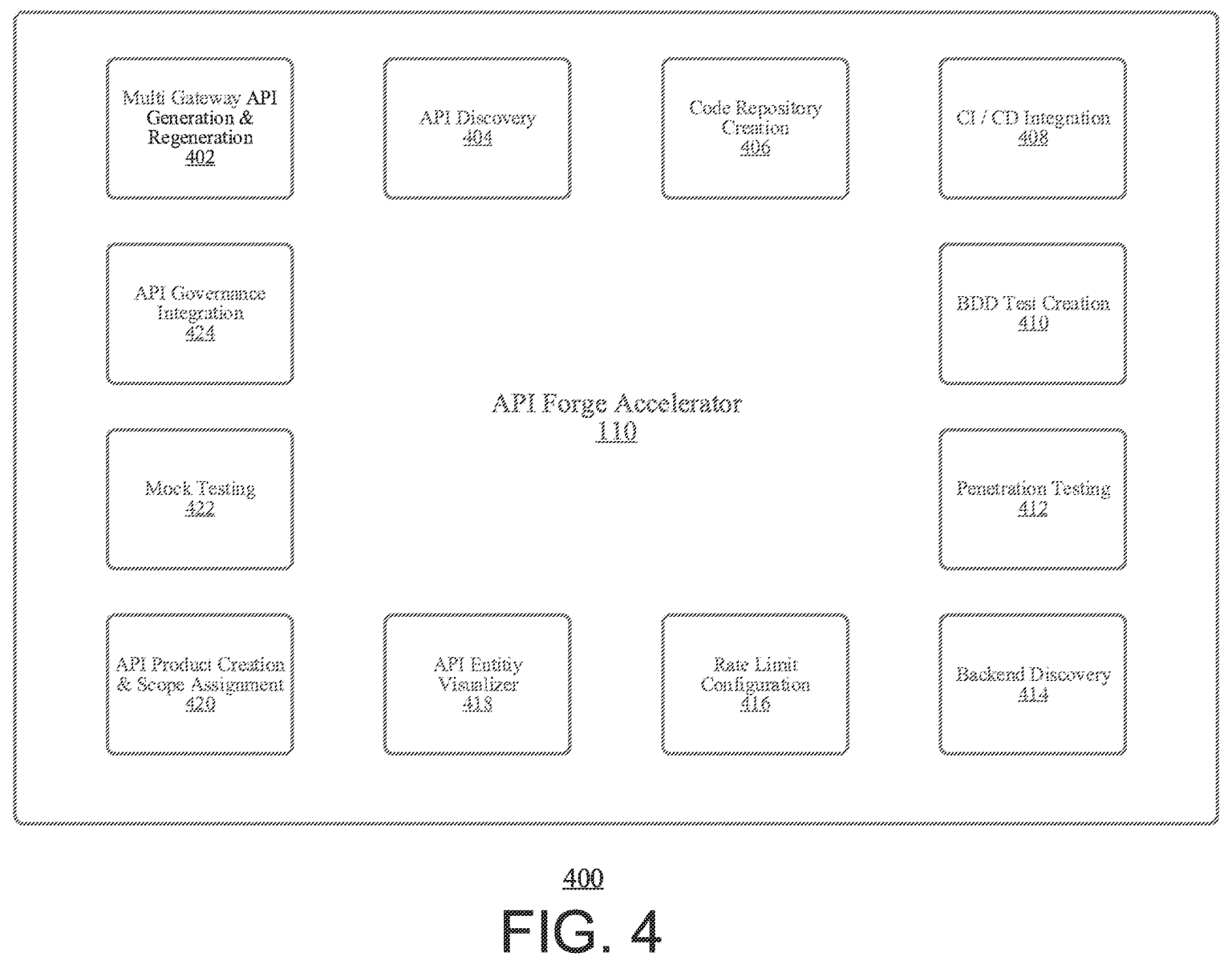

API Forge Accelerator
110

Multi Gateway API
Generation &
Regeneration
402

API Discovery
404

Code Repository
Creation
406

CI / CD Integration
408

BDD Test Creation
410

Penetration Testing
412

Backend Discovery
414

Rate Limit
Configuration
416

API Entity
Visualizer
418

API Product Creation
& Scope Assignment
420

Mock Testing
422

API Governance
Integration
424

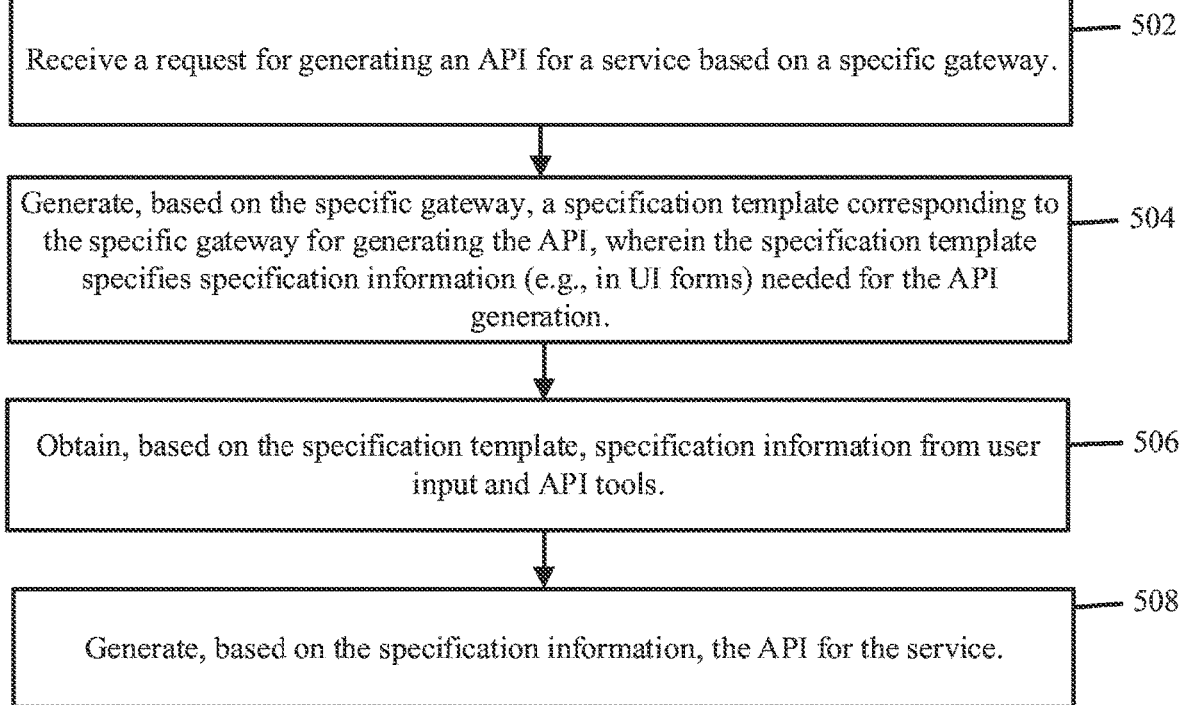

Receive a request for generating an API for a service based on a specific gateway. — 502

Generate, based on the specific gateway, a specification template corresponding to the specific gateway for generating the API, wherein the specification template specifies specification information (e.g., in UI forms) needed for the API generation. — 504

Obtain, based on the specification template, specification information from user input and API tools. — 506

Generate, based on the specification information, the API for the service. — 508

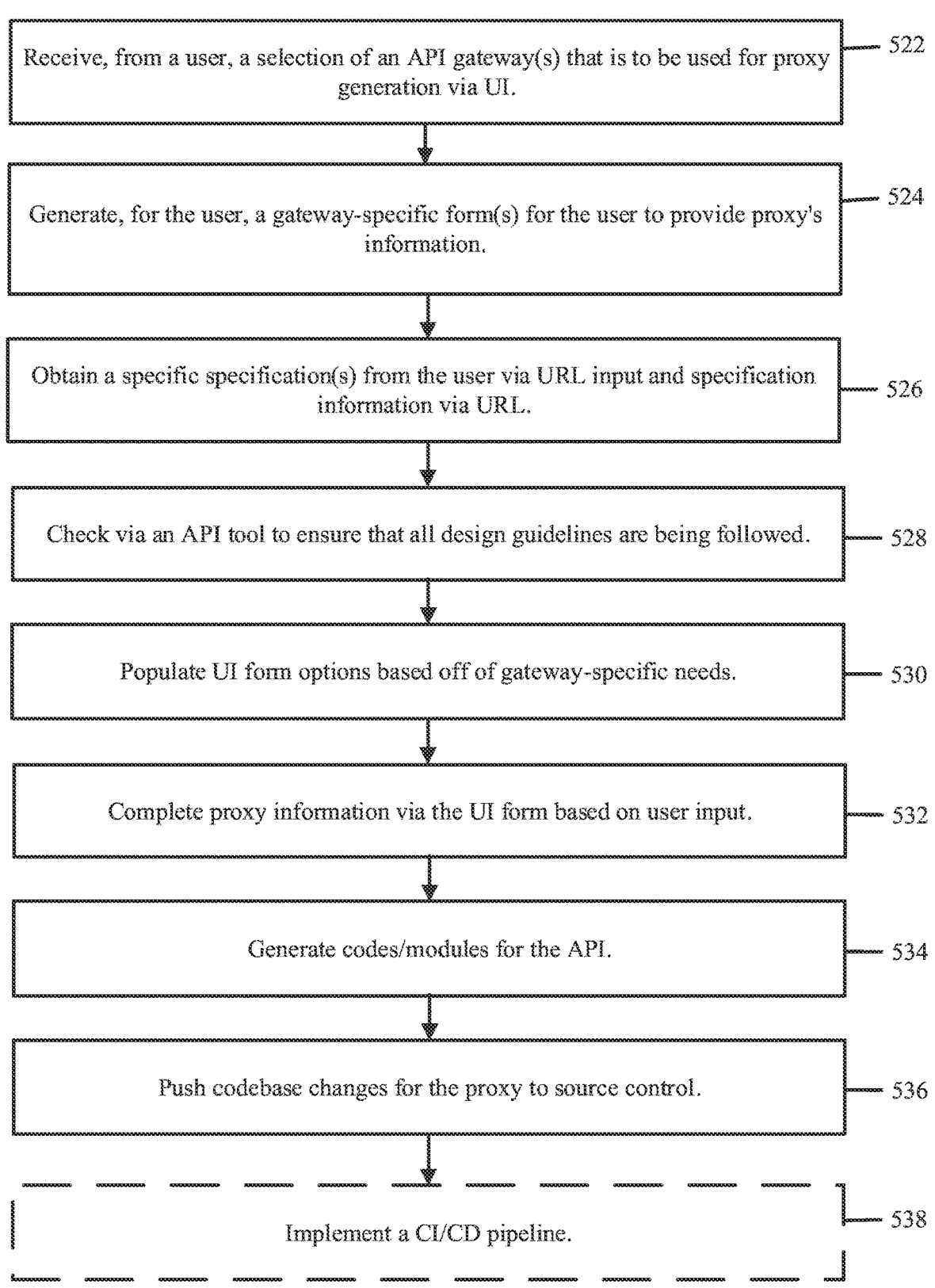

Receive, from a user, a selection of an API gateway(s) that is to be used for proxy generation via UI. — 522

Generate, for the user, a gateway-specific form(s) for the user to provide proxy's information. — 524

Obtain a specific specification(s) from the user via URL input and specification information via URL. — 526

Check via an API tool to ensure that all design guidelines are being followed. — 528

Populate UI form options based off of gateway-specific needs. — 530

Complete proxy information via the UI form based on user input. — 532

Generate codes/modules for the API. — 534

Push codebase changes for the proxy to source control. — 536

Implement a CI/CD pipeline. — 538

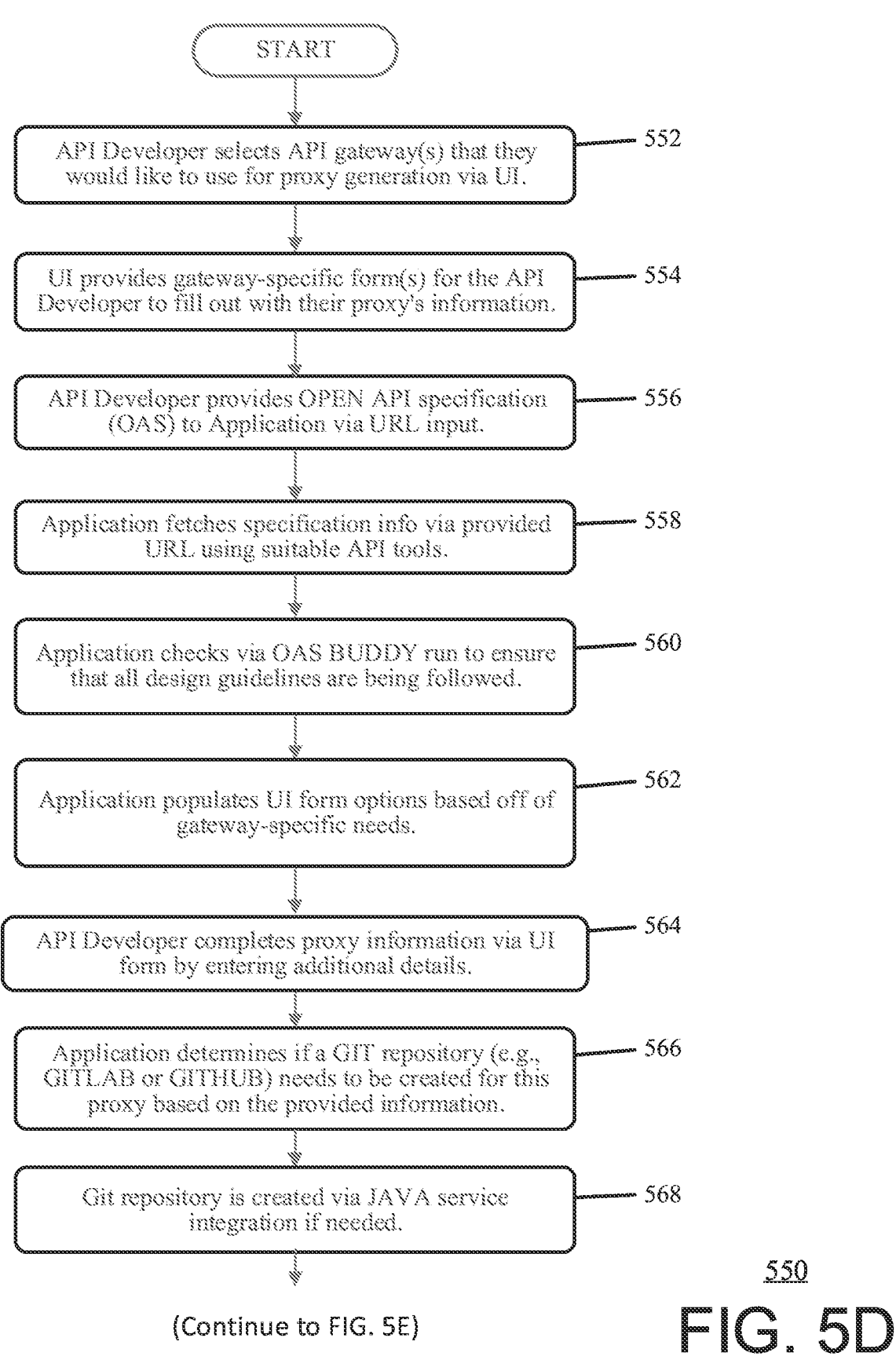

START

API Developer selects API gateway(s) that they would like to use for proxy generation via UI. — 552

UI provides gateway-specific form(s) for the API Developer to fill out with their proxy's information. — 554

API Developer provides OPEN API specification (OAS) to Application via URL input. — 556

Application fetches specification info via provided URL using suitable API tools. — 558

Application checks via OAS BUDDY run to ensure that all design guidelines are being followed. — 560

Application populates UI form options based off of gateway-specific needs. — 562

API Developer completes proxy information via UI form by entering additional details. — 564

Application determines if a GIT repository (e.g., GITLAB or GITHUB) needs to be created for this proxy based on the provided information. — 566

Git repository is created via JAVA service integration if needed. — 568

FIG. 5D (Continue from FIG. 5D)

Figure 5E:
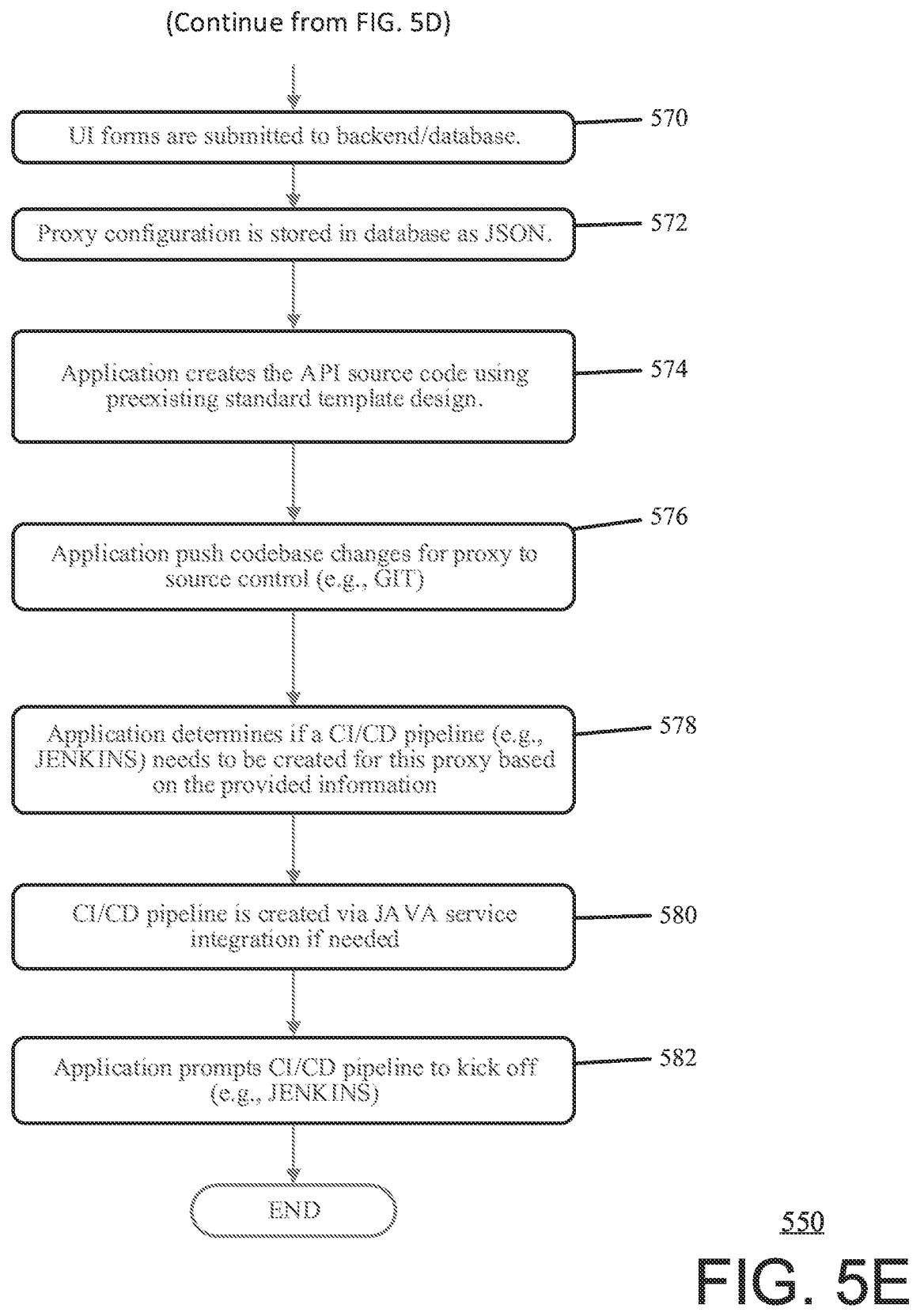

UI forms are submitted to backend/database. ——— 570

Proxy configuration is stored in database as JSON. ——— 572

Application creates the API source code using preexisting standard template design. ——— 574

Application push codebase changes for proxy to source control (e.g., GIT) ——— 576

Application determines if a CI/CD pipeline (e.g., JENKINS) needs to be created for this proxy based on the provided information ——— 578

CI/CD pipeline is created via JAVA service integration if needed ——— 580

Application prompts CI/CD pipeline to kick off (e.g., JENKINS) ——— 582

END

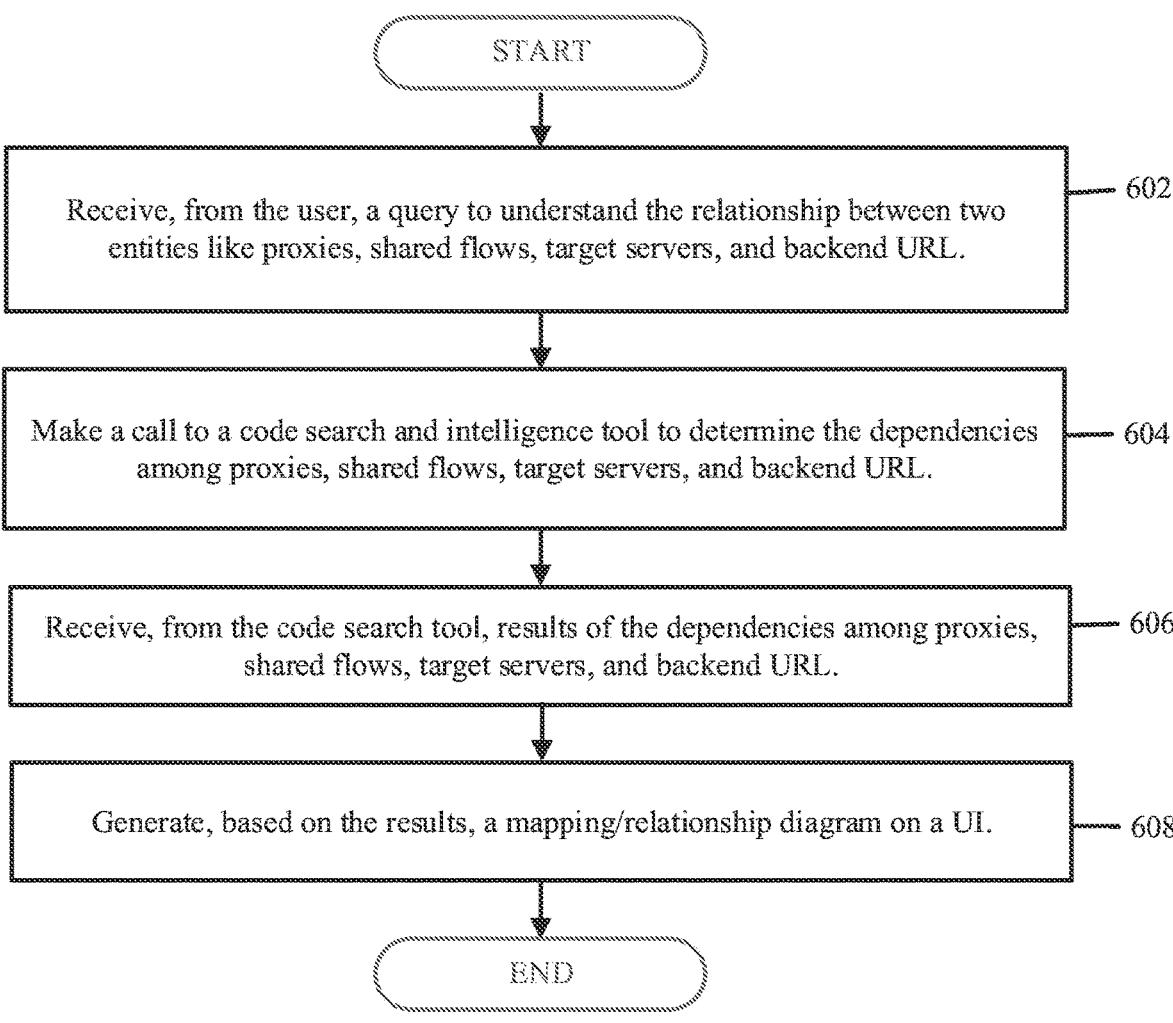

START

Receive, from the user, a query to understand the relationship between two entities like proxies, shared flows, target servers, and backend URL. — 602

Make a call to a code search and intelligence tool to determine the dependencies among proxies, shared flows, target servers, and backend URL. — 604

Receive, from the code search tool, results of the dependencies among proxies, shared flows, target servers, and backend URL. — 606

Generate, based on the results, a mapping/relationship diagram on a UI. — 608

END

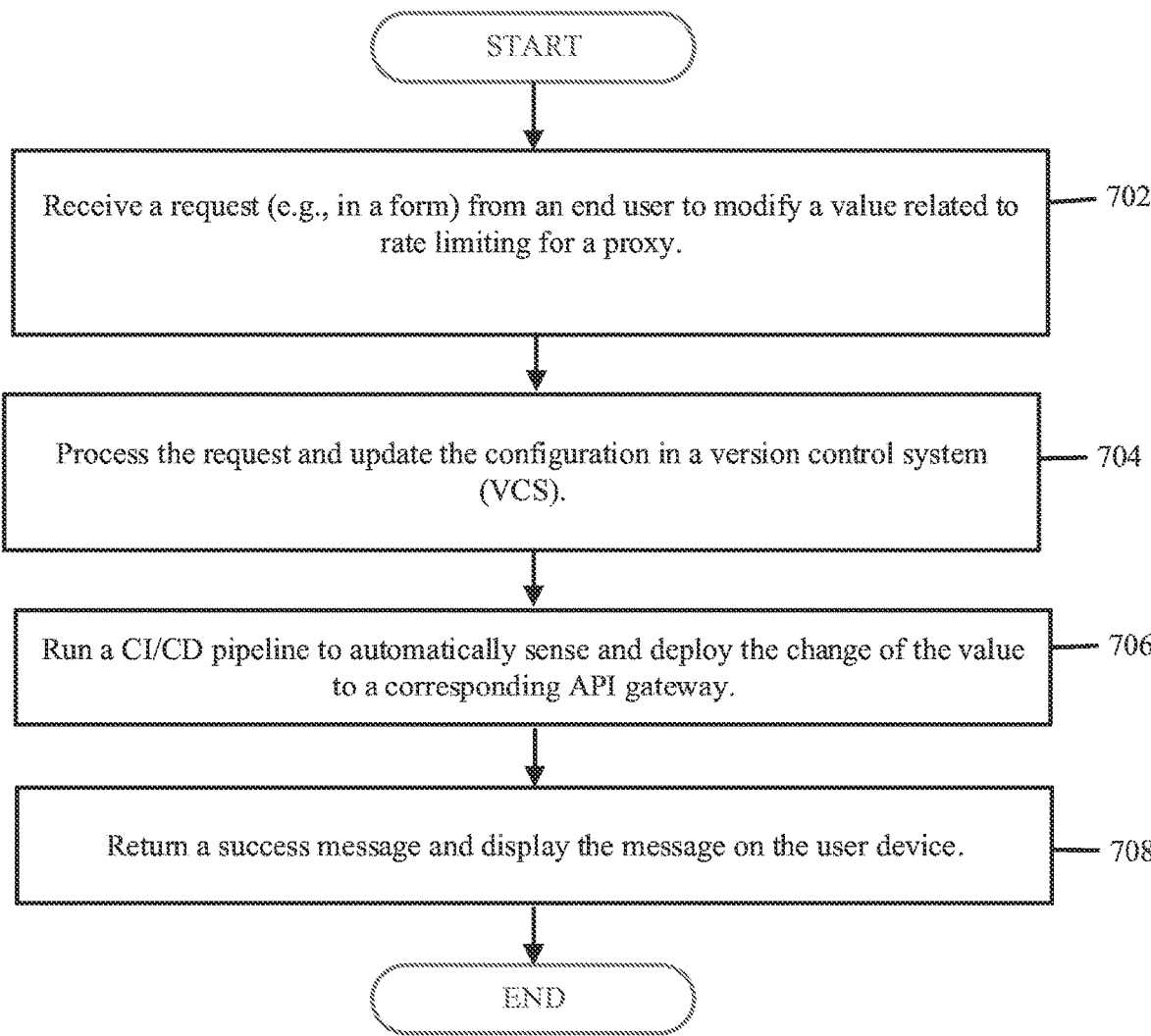

START

Receive a request (e.g., in a form) from an end user to modify a value related to rate limiting for a proxy. — 702

Process the request and update the configuration in a version control system (VCS). — 704

Run a CI/CD pipeline to automatically sense and deploy the change of the value to a corresponding API gateway. — 706

Return a success message and display the message on the user device. — 708

END

SYSTEMS AND METHODS FOR API FORGE ACCELERATOR

BACKGROUND

At present, the absence of a standardized and efficient approach to application programming interface (API) development presents substantial obstacles and delays. When developers work on API builds, the process typically spans almost a month and often does not follow any standards. This lack of standardization complicates operational and production support, leading to significant challenges for overall operations. Moreover, without clear guidelines, the API building process becomes convoluted with numerous labor-intensive steps, further prolonging the completion time. Accordingly, there remains a need for technical optimization in the API development process.

SUMMARY

In some examples, the present application may utilize an API management platform to facilitate an API deployment process. This platform serves the purpose of facilitating a seamless end-to-end application deployment with comprehensive configuration. It achieves this by effectively managing various resources, such as available API tools and existing API documentation. Additionally, the platform leverages external sources, including user input and external API tools or servers, to automatically integrate these disparate pieces of information. This integration process is carried out to create or update APIs in response to the requests of end users. In some instances, the API management platform incorporates an API Forge Accelerator. This accelerator plays a crucial role in coordinating the diverse array of resources and tasks necessary for the development or updating of APIs. In essence, the API Forge Accelerator streamlines and harmonizes the intricate processes involved in API management, ensuring a more efficient and effective approach to fulfilling end user requirements. This accelerator further enhances the overall user experience by effectively handling discrepancies across various API gateways at the backend, while presenting a standardized/unified frontend interface to users.

For instance, the API Forge Accelerator may let users pick a gateway from multiple options to create a service API. Upon selection, the accelerator may automatically generate a specification template associated with the chosen gateway. This template may indicate critical specification details essential for API generation, all without necessitating the user's familiarity with the specific rules governing the selected gateway. Utilizing inputs from the user and API tools in accordance with the provided specification template, the accelerator may take charge of generating vital source code, modules, and other relevant documentation. This process effectively streamlines the development and deployment of the API, eliminating complexity and ensuring a smoother user experience.

In one aspect, a method for developing an application programming interface (API) is provided. The method is performed by a computing system running an API Forge Accelerator. The method comprising: receiving, by the API Forge Accelerator, a request for generating an API for a service based on a first gateway, wherein the request indicates a selection of the first gateway among a plurality of gateways integrated with the API Forge Accelerator; generating, by the API Forge Accelerator, based on the specific gateway, a specification template corresponding to the specific gateway for generating the API, wherein the specification template indicates specification information that is used for the API generation; obtaining, by the API Forge Accelerator, based on the specification template, specification information from user input and API tools; and generating, by the API Forge Accelerator, based on the specification information, the API for the service.

Examples may include one of the following features, or any combination thereof. For instance, in some examples, obtaining, by the API Forge Accelerator, based on the specification template, the specification information from user input and API tools further comprises: obtaining, by the API Forge Accelerator, a uniform resource locator (URL) to a specification corresponding to the API, wherein the specification defines operations and formats corresponding to the API; and obtaining, by the API Forge Accelerator via the URL, the specification corresponding to the API using a first API tool among the API tools.

In some instances, the method further comprises: verifying, by the API Forge Accelerator, that design guidelines are being followed.

In some variations, the method further comprises: displaying, by the API Forge Accelerator, based on determining that the verification fails, one or more corrective actions on a user device.

In some examples, the specification template includes one or more user interface (UI) forms indicating the specification information needed for the API generation, and wherein obtaining, by the API Forge Accelerator, based on the specification template, the specification information from user input and API tools further comprises: obtaining, by the API Forge Accelerator, the specification information requested by the one or more UI forms corresponding to the specific gateway via user input and information obtained from the API tools.

In some instances, the one or more UI forms further indicates information needed for creating one or more API artifacts for the API.

In some variations, generating, by the API Forge Accelerator, based on the specification information, the API for the service further comprises: generating, by the API Forge Accelerator, documentations for the one or more API artifacts corresponding to the specific gateway.

In some examples, generating, by the API Forge Accelerator, based on the specification information, the API for the service further comprises: generating, by the API Forge Accelerator using one or more API tools among the API tools, source codes for the API in accordance with pre-defined standard template design; and updating, by the API Forge Accelerator, based on the generated source code, corresponding source codes associated with the API in a version control system (VCS).

In some instances, the method further comprises: determining, by the API Forge Accelerator, whether a continuous integration/continuous deployment (CI/CD) pipeline exists for the API; and creating, by the API Forge Accelerator, a CI/CD pipeline, based on determining that there is no existing CI/CD pipeline for the API.

In some variations, the method further comprises: prompting, by the API Forge Accelerator, the CI/CD pipeline to kick off.

In some examples, the CI/CD pipeline comprises operations of: retrieving source code from a version control system (VCS); executing build scripts to build/package the source code; performing a code quality check; conducting a static code analysis using an external tool; saving the packaged code to an artifact repository; deploying the code to the specific gateway; performing integration testing; deploying the code to additional environments; and performing penetration testing.

In some instances, based on any of the operations by the CI/CD pipeline failing, the API Forge Accelerator notifies the failure and proceeds to the next operation after the failure is fixed.

In some variations, the method further comprises: receiving, by the API Forge Accelerator, a second request from a user device to modify a value for a proxy associated with the API; updating, by the API Forge Accelerator, based on the second request, configuration of the proxy in a VCS to modify the value; running, by the API Forge Accelerator, a CI/CD pipeline to automatically sense and deploy the modification of the value to the specific gateway; and returning, by the API Forge Accelerator, a success message and displaying the message on the user device.

In some examples, the method further comprises: receiving, by the API Forge Accelerator, a query to inspect relationship between two entities among proxies, shared flows, target servers, and backend URL associated with the API; calling, by the API Forge Accelerator, to a code search tool to determine dependencies among the proxies, shared flows, target servers, and backend URL associated with the API; receiving, by the API Forge Accelerator, results of the dependencies among the proxies, shared flows, target servers, and backend URL associated with the API; and generating, by the API Forge Accelerator, based on the results, a relationship diagram on the user device.

In some instances, the method further comprises: providing, by the API Forge Accelerator to a user device, sample codes to build a test suite using one or more testing frameworks.

In another aspect, an application programming interface (API) Forge Accelerator computing system is provided. The computing system comprises: one or more processors; and a non-transitory computer-readable medium having processor-executable instructions stored thereon. The processor-executable instructions, when executed, facilitate: receiving a request for generating an API for a service based on a first gateway, wherein the request indicates a selection of the first gateway among a plurality of gateways integrated with the API Forge Accelerator; generating, based on the specific gateway, a specification template corresponding to the specific gateway for generating the API, wherein the specification template indicates specification information that is used for the API generation; obtaining, based on the specification template, specification information from user input and API tools; and generating, based on the specification information, the API for the service.

Examples may include one of the following features, or any combination thereof. For instance, in some examples, the processor-executable instructions, when executed, further facilitate: receiving a second request from a user device to modify a value for a proxy associated with the API; updating, based on the second request, configuration of the proxy in a source control system (VCS) to modify the value; running, a continuous integration/continuous deployment (CI/CD) pipeline to automatically sense and deploy the modification of the value to the specific gateway; and returning, a success message and displaying the message on the user device.

In some instances, the processor-executable instructions, when executed, further facilitate: receiving, a query to inspect relationship between two entities among proxies, shared flows, target servers, and backend uniform resource locator (URL) associated with the API; calling, to a code search tool to determine dependencies among the proxies, shared flows, target servers, and backend URL associated with the API; receiving, results of the dependencies among the proxies, shared flows, target servers, and backend URL associated with the API; and generating, based on the results, a relationship diagram on the user device.

In some variations, the processor-executable instructions, when executed, further facilitate: providing sample codes to build a test suite using one or more testing frameworks.

In yet another aspect, a non-transitory computer-readable medium having processor-executable instructions stored thereon is provided. The processor-executable instructions, when executed, facilitate: receiving a request for generating an API for a service based on a first gateway, wherein the request indicates a selection of the first gateway among a plurality of gateways integrated with the API Forge Accelerator; generating, based on the specific gateway, a specification template corresponding to the specific gateway for generating the API, wherein the specification template indicates specification information that is used for the API generation; obtaining, based on the specification template, specification information from user input and API tools; and generating, based on the specification information, the API for the service.

All examples and features mentioned above may be combined in any technically possible way.

BRIEF DESCRIPTION OF THE DRAWINGS

The subject technology will be described in even greater detail below based on the exemplary figures but is not limited to the examples. All features described and/or illustrated herein can be used alone or combined in different combinations. The features and advantages of various examples will become apparent by reading the following detailed description with reference to the attached drawings which illustrate the following:

FIG. 4 is a simplified block diagram demonstrating exemplary capabilities of the API Forge Accelerator in accordance with one or more examples of the present application.

FIG. 5A is an exemplary process for developing APIs in accordance with one or more examples of the present application.

FIG. 5B is another exemplary process for developing APIs in accordance with one or more examples of the present application.

FIGS. 5D-5E demonstrate an exemplary process for developing APIs in accordance with one or more examples of the present application.

FIG. 6 is an exemplary process for entity visualizer in accordance with one or more examples of the present application.

FIG. 7 is an exemplary process for configuring rate limiting in accordance with one or more examples of the present application.

DETAILED DESCRIPTION

Examples of the presented application will now be described more fully hereinafter with reference to the accompanying FIGS., in which some, but not all, examples of the application are shown. Indeed, the application may be exemplified in different forms and should not be construed as limited to the examples set forth herein; rather, these examples are provided so that the application will satisfy applicable legal requirements. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

Figure 1:
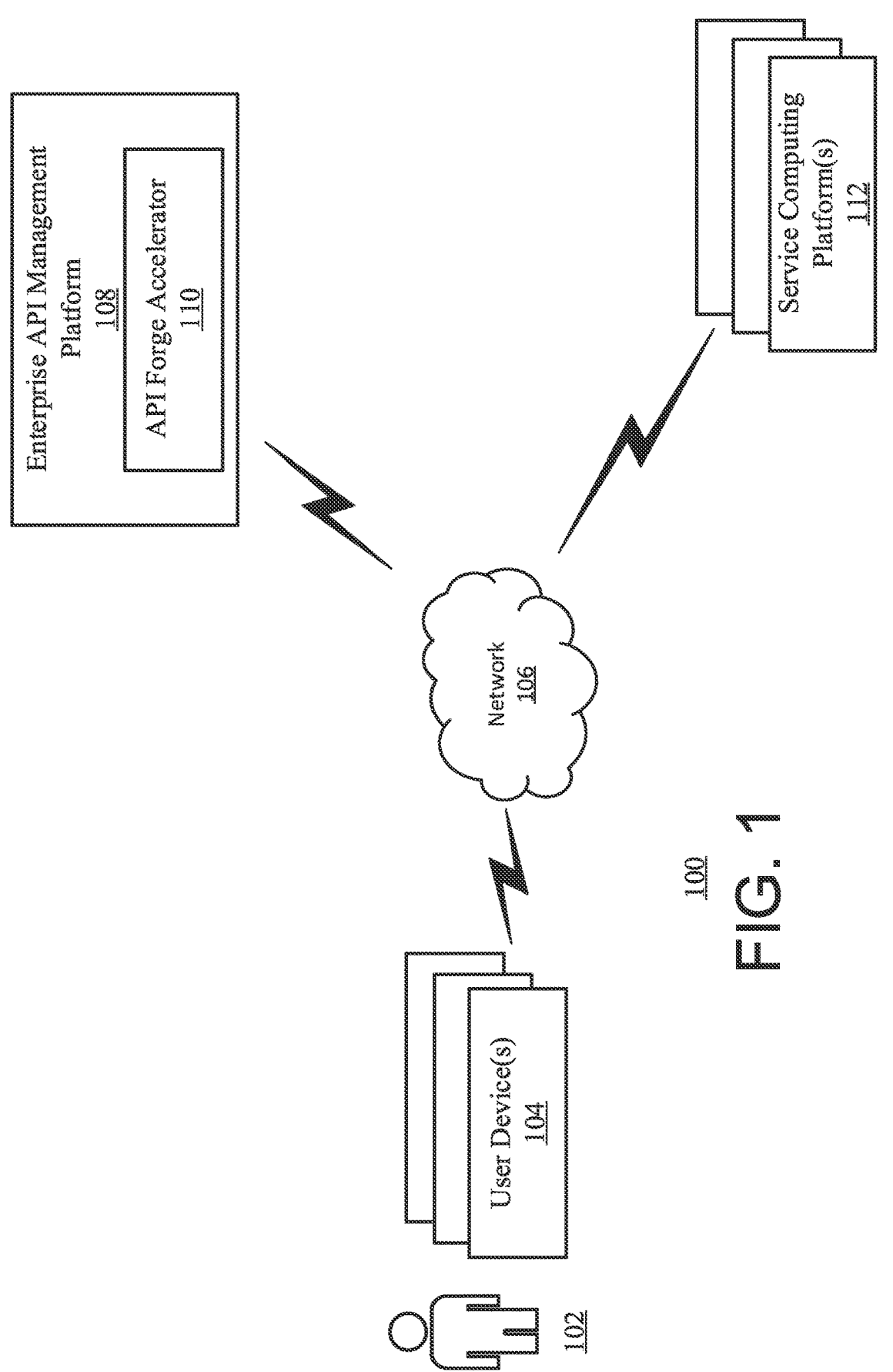
FIG. 1 is a simplified block diagram depicting an exemplary computing environment in accordance with one or more examples of the present application.

Systems, methods, and computer program products are herein disclosed that provide for standardized and automated API development and deployment, resulting in a streamlined and efficient process. FIG. 1 is a simplified block diagram depicting an exemplary environment 100 in accordance with an example of the present application. The environment 100 includes one or more user devices 104, an enterprise API management platform 108, and one or more service computing platforms 112. The enterprise API management platform 108 includes an API Forge Accelerator 110. Although the entities within environment 100 may be described below and/or depicted in the FIGS. as being singular entities, it will be appreciated that the entities and functionalities discussed herein may be implemented by and/or include one or more entities.

The entities within the environment 100 such as the one or more user devices 104, the enterprise API management platform 108, and the one or more service computing platforms 112 may be in communication with other systems within the environment 100 via the network 106. The network 106 may be a global area network (GAN) such as the Internet, a wide area network (WAN), a local area network (LAN), or any other type of network or combination of networks. The network 106 may provide a wireline, wireless, or a combination of wireline and wireless communication between the entities within the environment 100. Additionally, and/or alternatively, the devices or systems within environment 100 may be in communication with each other without using the network 106. For instance, the user devices 102 may directly provide their information to the enterprise API management platform 108 using one or more wired connections and/or one or more communication protocols.

Each of the user devices 104 is and/or includes one or more computing devices and/or systems that are configured to provide data (e.g., user inputs) to the enterprise API management platform 108. For example, the user devices 104 are and/or include one or more computing devices, computing platforms, systems, servers, desktops, laptops, tablets, mobile devices (e.g., smartphone device, or other mobile device), or any other type of computing device that generally comprises one or more communication components, one or more processing components, and one or more memory components.

The user devices 104 may act as gateways for end users 102 to engage with various entities in the environment 100. For example, developers, such as end users, may access the enterprise API management platform 108 via their user devices 104 to develop/manage APIs associated with specific services. Once the APIs are developed and deployed onto the service computing platforms 112, customers, such as end users, may access the services provided by the service computing platforms 112 through dedicated APIs, using their respective user devices 104.

The enterprise API management platform 108 provides a comprehensive solution that enables the enterprise organization to design, deploy, monitor, and secure their Application Programming Interfaces (APIs). An API (Application Programming Interface) is a set of rules and protocols that allows different software applications to communicate and interact with each other, enabling them to exchange data and functionality seamlessly. For instance, an API may be a software interface, hosted by one or more computing devices/systems, that offers a service to other pieces of software. The enterprise organization may be any type of corporation, company, organization, and/or other institution. The enterprise API management platform 108 acts as a centralized system to streamline the entire lifecycle of APIs, from their creation to their consumption by end-users (e.g., developers or customers). Moreover, the enterprise API management platform 108 facilitates efficient and secure interactions between various applications, services, and data sources within the enterprise organization and with external partners or developers.

In some examples, the enterprise API management platform 108 engages with developers using user devices 104 to facilitate API development. By interacting with developers through these user devices 104, the platform 108 obtains (e.g., collects and/or gathers) essential details, which the platform 108 may then use to coordinate available resources, such as API tools, within the platform 108 to build new APIs and/or update existing ones.

In some instances, the enterprise API management platform 108 collaborates with the service computing platforms 112 to streamline API deployment. Following instructions from developers, the platform 108 deploys APIs to dedicated services, allowing customers to access these services seamlessly on the service computing platform 112 via the specified APIs.

The enterprise API management platform 108 includes an API Forge Accelerator 110. The API Forge Accelerator 110 interacts with the user devices 104 and efficiently coordinates available resources on the enterprise API management platform 108 to facilitate standardized and automated development processes. Based on implementing the API Forge Accelerator 110, API development becomes remarkably streamlined, enabling the building of an API in less than five minutes. Furthermore, the API Forge Accelerator 110 provides a unified solution, accommodating various types of API gateways chosen by developers. The API Forge Accelerator 110 facilitates the seamless coordination of user input and resources, leading to significant improvements in speed, scalability, and consistency during API development. This transformative process revolutionizes the traditional approach to building APIs, significantly reducing the time and effort required for development.

In some examples, as shown, the platform 108 may perform or execute the functions of the API Forge Accelerator 110. In other examples, the platform 108 and one or more user devices 104 may perform or execute the functions of the API Forge Accelerator 110. For instance, the user devices 104 may execute a frontend application for the API Forge Accelerator 110 and the enterprise API management platform 108 may execute a backend application for the API Forge Accelerator 110.

The enterprise API management platform 108 may include and/or be implemented using one or more computing platforms, devices, servers, and/or apparatuses. For instance, in some examples, a single computing platform may perform the functionalities of the API Forge Accelerator 110 and facilitate the automated API development. In other examples, separate computing platforms may be used to perform the functionalities of the API Forge Accelerator 110 and facilitate the automated API development. In some variations, the enterprise API management platform 108 may be implemented as engines, software functions, and/or applications. In other words, the functionalities of the enterprise API management platform 108 may be implemented as software instructions stored in storage (e.g., memory) and executed by one or more processors.

The service computing platform 112 may be and/or include, but is not limited to, one or more computing devices, computing platforms, systems, servers, desktops, laptops, tablets, mobile devices (e.g., smartphone device, or other mobile device), or any other type of computing device that generally comprises one or more communication components, one or more processing components, and one or more memory components. The service computing platform 112 may be able to execute software applications managed by, in communication with, and/or otherwise associated with the enterprise organization. Additionally, and/or alternatively, the extraction computing system 108 may be configured to perform other functions.

The enterprise API management platform 108 and/or the service computing platform 112 may be configured to perform one or more actions after detecting/obtaining user inputs (e.g., requests to build new APIs and/or run services using particular APIs). For example, the enterprise API management platform 108 and/or the service computing platform 112 may include and/or be associated with a database that receives the detected user inputs. The database may store the detected user inputs, and a computing device or entity may retrieve and use the detected user inputs for one or more functions. For instance, the enterprise API management platform 108 and/or the service computing platform 112 may store the detected user inputs in a database. Then, the enterprise API management platform 108, the service computing platform 112, and/or another computing entity may retrieve the user inputs from the database and use the user inputs.

In some instances, the user devices 104 may include and/or be in communication with a display device that presents (e.g., displays) a user interface serving as a portal to the API development process on the enterprise API management platform 108 or to access services provided on the service computing platform 112. The user interface enables end users to interact with and navigate through the API development or service usage seamlessly, enhancing overall experience by the users and facilitating efficient API management and service consumption.

Additionally, and/or alternatively, the API Forge Accelerator 110 may enhance standardization and unification of the API development and deployment process by generating standardized specification templates that outline the required information and procedures for the specific tasks. This enables the API Forge Accelerator 110 to effectively manage discrepancies across various API gateways at the backend, while presenting a unified frontend interface to users, significantly improving the overall user experience.

It will be appreciated that the exemplary environment depicted in FIG. 1 is merely an example, and that the principles discussed herein may also be applicable to other situations—for example, including other types of institutions, organizations, devices, systems, and network configurations. As will be described herein, the environment 100 may be used by health care enterprise organizations. However, in other instances, the environment 100 may be used by other types of enterprise organizations such as financial institutions or insurance institutions.

Figure 2:
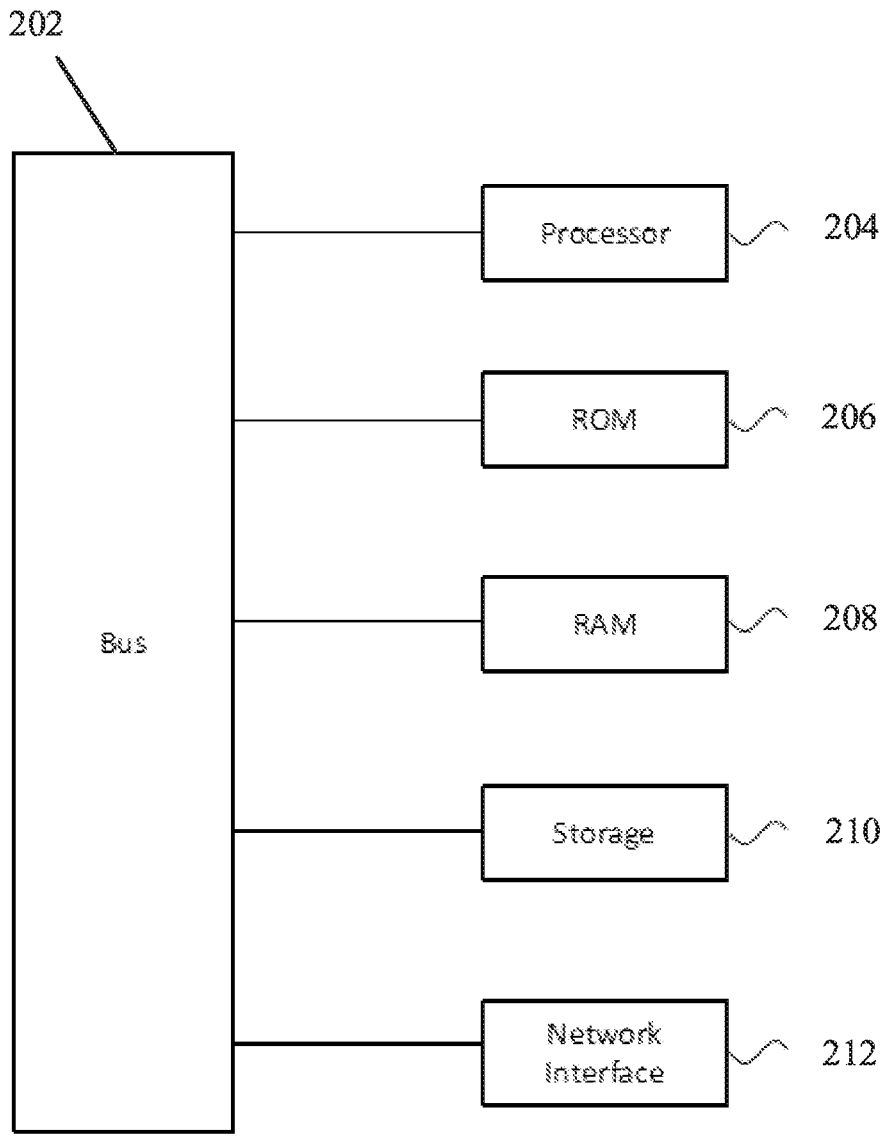
FIG. 2 is a simplified block diagram of one or more devices or systems within the exemplary environment of FIG. 1.

FIG. 2 is a block diagram of an exemplary system and/or device 200 (e.g., the user devices 104, the enterprise API management platform 108, and/or the service computing platform 112) within the environment 100. The device/system 200 includes a processor 204, such as a central processing unit (CPU), controller, and/or logic, that executes computer executable instructions for performing the functions, processes, and/or methods described herein. In some examples, the computer executable instructions are locally stored and accessed from a non-transitory computer readable medium, such as storage 210, which may be a hard drive or flash drive. Read Only Memory (ROM) 206 includes computer executable instructions for initializing the processor 204, while the random-access memory (RAM) 208 is the main memory for loading and processing instructions executed by the processor 204. The network interface 212 may connect to a wired network or cellular network and to a local area network or wide area network, such as the network 106. The device/system 200 may also include a bus 202 that connects the processor 204, ROM 206, RAM 208, storage 210, and/or the network interface 212. The components within the device/system 200 may use the bus 202 to communicate with each other. The components within the device/system 200 are merely exemplary and might not be inclusive of every component, server, device, computing platform, and/or computing apparatus within the device/system 200. Additionally, and/or alternatively, the device/system 200 may further include components that might not be included within every entity of environment 100.

Figure 3A:
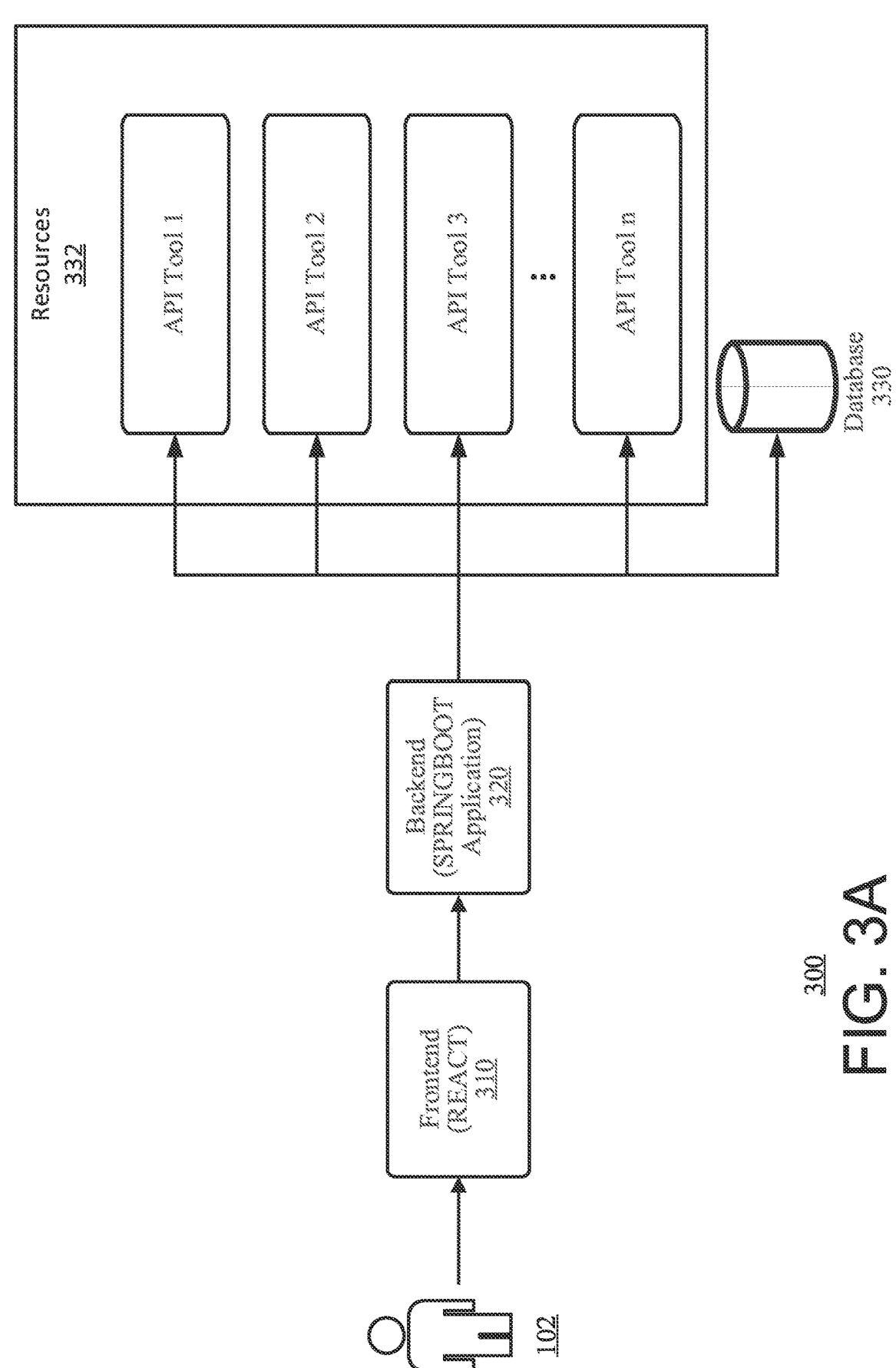
FIG. 3A is an exemplary system design in accordance with one or more examples of the present application.

FIG. 3A is an exemplary system design 300 in accordance with one or more examples of the present application. The system design 300 may implement the API Forge Accelerator 110 to interact with the user devices 104 and/or the resources on the enterprise API management platform 108 within the network 100, as shown in FIG. 1. For instance, in some examples, the platform 108 may implement the system design 300 including the frontend and backend applications 310, 320. In other examples, the user device 104 may implement the frontend application 310 and the platform 108 may implement the backend application 320.

The API Forge Accelerator 110 includes several functional modules that may be supported by appropriate software and/or hardware components. The various functional modules may include a frontend application 310, a backend application 320, and database 330.

The API Forge Accelerator 110 may interact with end users (e.g., developers) 102 through its frontend application 310. In some examples, the front-end application 310 may incorporate a user interface (UI) built using components from a front-end JAVASCRIPT library (such as REACT). The UI may be presented on user devices 104 as shown in FIG. 1. End users 102 may submit requests through the UI to initiate an API development process. Additionally, the API Forge Accelerator 110 may provide UI forms to request specific information (e.g., a uniform resource locator or URL) from end users 102 during the API development. In some instances, the API Forge Accelerator 110 may cause display of the API development/deployment process to end users 102 through the UI on the user devices 104. The data exchanged between the API Forge Accelerator 110 (or the enterprise API management platform 108) and the user devices 104 may include various types of information, such as user inputs, requests, and responses. This may range from text data, images, and multimedia content to structured data formats like JAVASCRIPT Object Notation (JSON) or extensible markup language (XML), depending on the nature of the application or service being accessed. Additionally, authentication tokens and security-related data may be exchanged to ensure secure communication between the user devices 104 and the API Forge Accelerator 110. The UI of the frontend application 310 may make API calls to the backend (e.g., backend application 320).

The API Forge Accelerator 110 may orchestrate resources 332 (e.g., API tools 1, 2 . . . n) on the enterprise API management platform 108 through the backend application 320. For example, the backend application 320 may employ a first application such as JAVA SPRING BOOT (or SPRINGBOOT) to invoke and orchestrate API tools (e.g., for query, coding, authentication, testing, etc.) on the enterprise API management platform 108, enabling automatic configuration of specific interfaces through the API tools, streamlining the process of API management and development. In some examples, the backend application 320 may include a JAVA application (e.g., SPRINGBOOT application) that is running on a virtual machine (VM) inside a cloud (e.g., in environment 100). To this end, the VM may converse with SQL database to store proxy information during API development. The backend application 320 may make calls to the frontend application 310 to get to the specific user.

The API Forge Accelerator 110 may store API documentation and/or maintain an API inventory in the database 330. For instance, the database 330 may store a comprehensive list of all the APIs available within an organization or system and their corresponding documentation. The documentation may provide essential details about each API to assist developers, administrators, and other stakeholders in understanding and managing the APIs effectively.

Figure 3B:
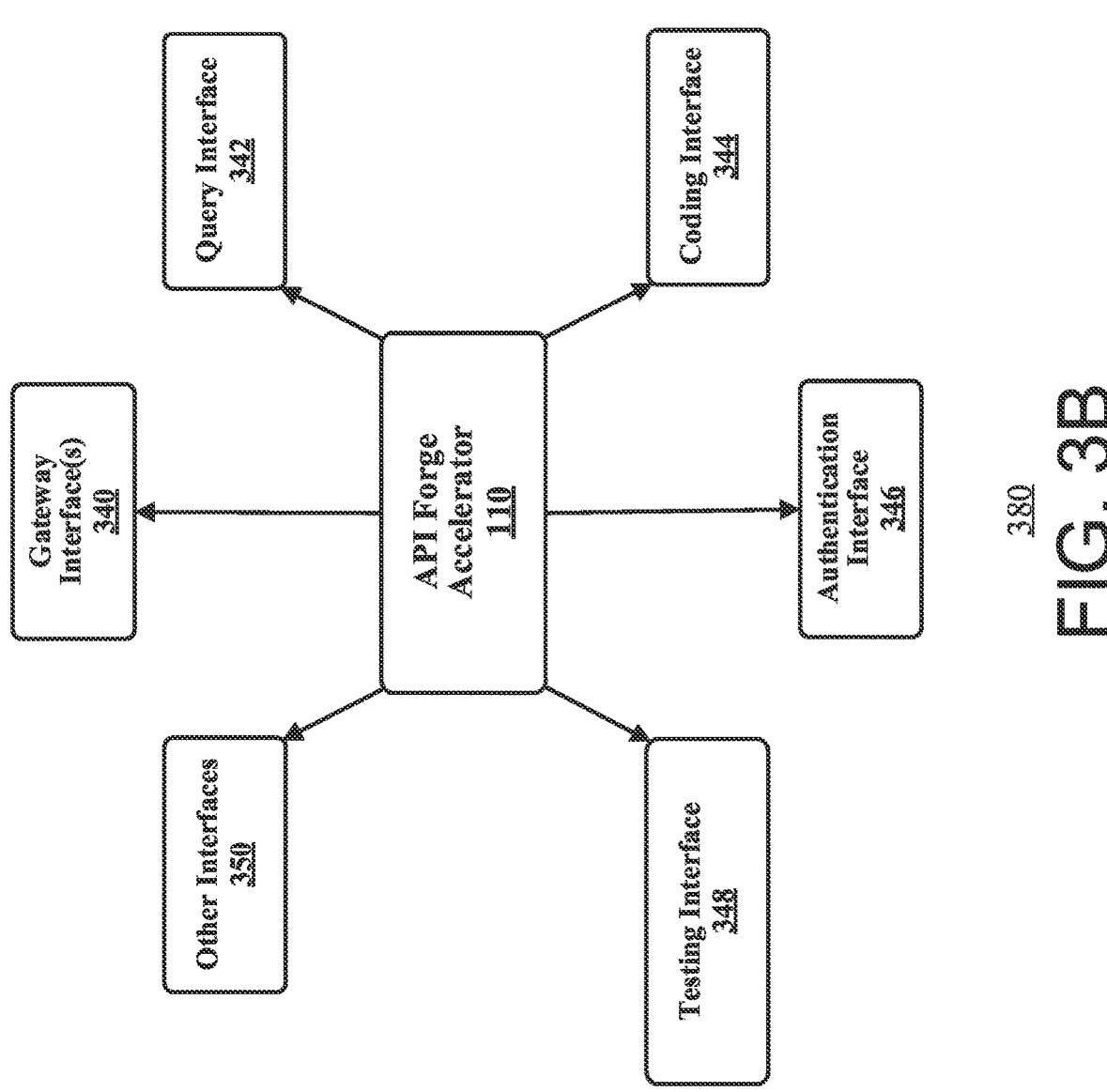
FIG. 3B is a simplified block diagram demonstrating exemplary interfaces in accordance with one or more examples of the present application.

FIG. 3B is a simplified block diagram 380 demonstrating exemplary interfaces in accordance with one or more examples of the present application. The API Forge Accelerator 110 invokes and orchestrates API tools (e.g., resources on the platform 108) through the one or more interfaces shown in FIG. 3B using the backend application 320 as shown in FIG. 3A to configure various aspects of an API, making the API development and management process more efficient and user-friendly. The interfaces may include but not limited to one or more gateway interfaces 340, a query interface 342, a coding interface 344, an authentication interface 346, a testing interface 348, and other interfaces 350.

One or more gateway interfaces 340 may be connected to an API tool that serves as a single entry point for all API calls and is responsible for managing and routing requests to appropriate backend services according to the specific gateway. The API Forge Accelerator 110 enables developers to select a gateway interface 340 from a number of options, including but not limited to APIGEE or AZURE API Gateway.

A query interface 342 may be connected to an API tool that allows developers to create and customize query parameters to filter, sort, or limit data returned from the API.

A coding interface 344 may be connected to an API tool that provides code generation options for multiple programming languages, allowing developers to automatically generate code snippets to interact with the API.

An authentication interface 346 may be connected to an API tool that provides various authentication methods like API keys, Open Authorization (OAUTH), or JSON web-based token (JWT), allowing developers to configure how users and applications authenticate with the API.

A testing interface 348 may be connected to an API tool that includes a testing suite that allows developers to execute automated tests on the API to ensure its functionality and performance.

Other interfaces 350 may include, but not limited to a documentation interface, a mocking interface, a rate limiting interface, an error handling interface, a security interface, and a versioning interface.

A documentation interface may be connected to an API tool that provides options to generate interactive API documentation based on the OPEN API Specification (OAS), making it easier for developers and users to understand and interact with the API. For example, through a documentation interface, the API Forge Accelerator 110 (e.g., the backend application 320) may integrate with a specific documentation API tool/service, such as OAS BUDDY, to enhance the user experience by validating specifications and providing scores and mitigation steps for addressing gaps.

A mocking interface may be connected to an API tool that generates mock responses for API endpoints, enabling developers to test their applications even before the actual API is fully developed.

A rate limiting interface may be connected to an API tool that allows developers to set rate limits for API calls to prevent abuse and manage API usage.

An error handling interface may be connected to an API tool that facilitates the configuration of custom error messages and responses to be sent back to users when errors occur during API calls.

A security interface may be connected to an API tool that enables developers to configure security protocols, such as SSL/TLS encryption, to ensure secure communication between clients and the API.

A versioning interface may be connected to an API tool that supports versioning options, allowing developers to manage different versions of the API and ensure backward compatibility when updates are made.

Depending on the type and scope of particular tasks, the API Forge Accelerator 110 may intelligently and automatically identify and utilize specific interfaces to execute its functionalities. In some variations, one or more of the interfaces listed above may be combined and connected to a single API tool. In this way, the API tool may provide various functionalities through the interface.

FIG. 4 is a simplified block diagram 400 demonstrating exemplary capabilities of the API Forge Accelerator 110 in accordance with one or more examples of the present application. As depicted in FIG. 3A, the API Forge Accelerator 110 may leverage user inputs and autonomously coordinate the API tools through the interfaces shown in FIG. 3B. This seamless orchestration allows the API Forge Accelerator 110 to showcase the capabilities demonstrated in FIG. 4.

Referring to block 402 in FIG. 4, the API Forge Accelerator 110 may perform multi-gateway API generation and/ or regeneration. The generation/regeneration of APIs may include, but not limited to, building codebase or template to build API from scratch, or modifying API connections to different back-end applications and/or different Spike products. The API Forge Accelerator 110 may generate/regenerate APIs according to specific gateways selected by end users (e.g., developers). For instance, as developers select different gateways, the API Forge Accelerator 110 may automatically recognize the gateway-specific information needed in the development process. Then, the API Forge Accelerator 110 may generate a unified template to gather the required information from developers without expecting them to be familiar with gateway-specific rules. As such, the API Forge Accelerator 110 simplifies the API development experience for developers, regardless of the gateway they are working with.

Referring to block 404, the API Forge Accelerator 110 may perform API discovery, which refers to the process of locating and identifying available APIs within a network or system, such as the environment 100 or the enterprise API management platform 108.

Referring to block 406, the API Forge Accelerator 110 may perform code repository creation. For instance, the API Forge Accelerator 110 may invoke suitable API tools to generate code and/or provide sample codes to the end users (e.g., development) to build code repositories.

Referring to block 408, the API Forge Accelerator 110 is capable of continuous integration/continuous deployment (CI/CD) integration. For instance, the API Forge Accelerator 110 may coordinate with developers and/or API tools to ensure an automated process to efficiently build, test, and deploy code changes to production environments.

Referring to block 410, the API Forge Accelerator 110 may perform behavior-driven development (BDD) test creation. For instance, the API Forge Accelerator 110 may provide sample codes to the end users (e.g., development) to build a test suite using the necessary testing frameworks.

Referring to block 412, the API Forge Accelerator 110 may perform penetration testing. In some examples, the API Forge Accelerator 110 may incorporate penetration testing into a CI pipeline. For example, after the integration testing is completed, the API Forge Accelerator 110 may run the penetration testing to meet security needs.

Referring to block 414, the API Forge Accelerator 110 may perform backend discovery. Similarly, to the API discovery in block 404, the API Forge Accelerator 110 may locate and identify available backend servers/services within a network or system, such as the environment 100, the enterprise API management platform 108, or the service computing platforms 112.

Referring to block 416, the API Forge Accelerator 110 may perform rate limit configuration. For instance, the API Forge Accelerator 110 may set rate limits for API calls to prevent abuse and manage API usage automatically or based on user inputs.

Referring to block 418, the API Forge Accelerator 110 may perform API entity visualizer 418 to present valuable and informative data about APIs. FIG. 6 below illustrates an exemplary process 600 for invoking a visualizer.

Referring to block 420, the API Forge Accelerator 110 can perform API product creation and scope assignment. For example, end users (developments) may use the API Forge Accelerator 110 to create an API product (e.g., a collection of APIs) and manage granular level scope to the product.

Referring to block 422, the API Forge Accelerator 110 may perform mock testing, in which mock responses are generated for API endpoints, enabling testing of applications before the actual API is fully developed or deployed.

Referring to block 424, the API Forge Accelerator 110 is capable of API governance integration. For instance, the API Forge Accelerator 110 may incorporate an overall governance framework for a specific enterprise/organization, including policies, guidelines, and processes related to API development and management. The API Forge Accelerator 110 may follow the governance framework to create APIs.

It will be recognized by those skilled in the art that other suitable capabilities may be realized by the API Forge Accelerator 110. The capabilities of the API Forge Accelerator 110 may be built into source code during development. In some variations, the code coverage will indicate whether the source code fits the code coordinates.

With these capabilities, the API Forge Accelerator 110 provides a solution to achieve end-to-end application (e.g., API) to get it deployed with everything automatically configured.

FIG. 5A is an exemplary process 500 for developing APIs in accordance with one or more examples of the present application. The process 500 may be performed by the enterprise API management platform 108 (the platform 108) and more specifically the API Forge Accelerator 110 of environment 100 shown in FIG. 1. However, it will be recognized that the process 500 may be performed in any suitable environment and that any of the following blocks may be performed in any suitable order. The descriptions, illustrations, and processes of FIG. 5A are merely exemplary and the process 500, the platform 108, and/or the API Forge Accelerator 110 may use other descriptions, illustrations, and processes for developing APIs.

At block 502, an API Forge Accelerator 110 receives a request for generating an API for a service based on a specific gateway. The API Forge Accelerator 110 may receive the request from a user 102 through a UI implemented in a user device 104. The UI may be part of the frontend application 310 of the API Forge Accelerator 110, as shown in FIG. 3A. The request may include user's selection to a specific gateway, a specific service, and/or a specific type of API.

At block 504, the API Forge Accelerator 110 generates a specification template corresponding to the specific gateway for generating the API. The specification template indicates specification information that is used for the API generation. The API Forge Accelerator 110 may generate the specification template based on the request. For instance, the API Forge Accelerator 110 may identify the gateway selected by the user and then generates the specification template corresponding to the specific gateway. The specification information may include one or more workflows and one or more data forms relevant to API development. A workflow may outline a series of interconnected steps or tasks to be executed in a specific order, facilitating various goals or outcomes, such as creating code repositories, conducting a testing pipeline, etc. On the other hand, a data form may provide guidance to users for collecting essential information for API development. Alternatively, a data form may indicate information necessary to configure a specific aspect of the API corresponding to an interface. The data forms may be presented through web-based UI forms or other appropriate formats.

In some examples, the API Forge Accelerator 110 may initially generate an initial workflow or workflows and subsequently refine the workflow(s) based on the information collected during the process. This iterative approach enables the accelerator to continuously improve and optimize the workflows, ensuring a more efficient and tailored API development experience.

At block 506, the API Forge Accelerator 110 obtains the specification information from user input and API tools based on the specification template. The API Forge Accelerator 110 obtains user input through the frontend application 310. For example, the API Forge Accelerator 110 may provide one or more data forms to users to collect specific information requested by the data form(s). The API Forge Accelerator 110 interacts with API tools through the backend application 320. As detailed in FIGS. 3B and 4, the API Forge Accelerator 110 may communicate with API tools through one or more interfaces to obtain the information according to the specification template. For example, the API Forge Accelerator 110 may populate one or more data forms (e.g., corresponding to configuration of certain aspects) based on the user input and/or information collected from the API tools.

At block 508, the API Forge Accelerator 110 generates the API for the service based on the specification information. The API Forge Accelerator 110 may execute the workflow(s) and/or utilize the data forms to configure aspects of the API. In some instances, the API Forge Accelerator 110 may further execute a testing pipeline (e.g., a workflow) after completing the aspect configuration.

It will be recognized that the process 500 illustrates an example of generating a new API. However, it will be recognized that the fundamental principles of this process can be extended and applied to other suitable scenarios. For instance, the blocks of process 500 can be employed, either in whole or in part, to modify existing APIs or regenerate an API for an established one. This adaptability enables the core methodology to be applied to various API-related tasks, enhancing flexibility and efficiency in API management and development processes.

FIG. 5B demonstrates an exemplary process 520 for developing APIs in accordance with one or more examples of the present application. This process 520 provides additional details from the application's (e.g., the API Forge Accelerator 110) perspective to complement the blocks described in process 500 and provide an example of creating a new API. It will be appreciated that the process of generating API proxy demonstrated in FIG. 5B is merely exemplary. The principles discussed herein are applicable to generation of other API artifacts.

At block 522, the API Forge Accelerator 110 receives, from a user, a selection of an API gateway that is to be used for proxy generation via UI. The API Forge Accelerator 110 may receive the selection from the UI that is incorporated in the frontend application 310 of the API Forge Accelerator. The UI may be displayed on a user device 104 to allow interaction with the user. The API Forge Accelerator 110 may allow users to choose from a range of gateways based on the resource availability of the enterprise API management platform 108 (the platform 108). By ways of implementing the API Forge Accelerator 110, users are no longer required to meet the prerequisite of being familiar with a specific gateway before selecting it, as often required in the traditional approach. The API Forge Accelerator 110 streamlines the process, allowing users to easily work with any gateway without prior knowledge or selection barriers.

At block 524, the API Forge Accelerator 110 generates, for the user, a gateway-specific form(s) for the user to provide proxy's information. For instance, a specification template or its specification information may include the gateway-specific form(s). The API Forge Accelerator 110 request specific information, such as the proxy's information, from the user through the gateway-specific form(s). The proxy's information may include one or more uniform resource locators (URLs) to refer to specific resources on a network or system (e.g., environment 100 or the platform 108 in FIG. 1). In some variations, the URL information may be provided through user input and/or automated generation.

At block 526, the API Forge Accelerator 110 obtains a specific specification(s) from the user via URL input and specification information via URL. For instance, the API Forge Accelerator 110 may obtain OPEN API specification based on the URL input by the user and the corresponding specification information via SWAGGERHUB.

At block 528, the API Forge Accelerator 110 checks, via an API tool, to ensure that all design guidelines are being followed. In some variations, the API Forge Accelerator 110 may call a service integrated therein to verify the design guidelines. For instance, the API Forge Accelerator 110 may perform the check via OAS BUDDY run.

At block 530, the API Forge Accelerator 110 populates UI form options based off of gateway-specific needs. The API Forge Accelerator 110 may automatically populate UI form options based on user provided information and selected gateways. For instance, based on the selected gateway and the user input (e.g., URL input), the API Forge Accelerator 110 may check the API proxy name, target servers, resources, environments, and/or other suitable information.

At block 532, the API Forge Accelerator 110 completes proxy information via the UI form based on the user input. For instance, the API Forge Accelerator 110 may automatically fill out data forms pertaining to the configuration of the proxy through the backend application 320, using the information collected from the user through the frontend application 310. This seamless integration between the front-end and back-end applications streamlines the process, simplifying proxy configuration and enhancing the overall user experience.

At block 534, the API Forge Accelerator 110 generates codes/modules for the API. The API Forge Accelerator 110 may execute specific workflows and utilize information from the data forms to coordinate with one or more API tools on the platform 108 to generate the codes/modules. The codes/modules include but not limited to GIT repository, proxy configuration, and API source code). Additionally, the API Forge Accelerator 110 may store the codes/modules on the database 330 on the platform 108.

At block 536, the API Forge Accelerator 110 pushes codebase changes for the proxy to source control. For example, based on the user inputs, the API Forge Accelerator 110 may push the source code from an application server (that hosts the specific API tool for source code generation) to a version control system (that tracks and manages changes to source code and other relevant files).

At block 538, the API Forge Accelerator 110 may optionally implement a CI/CD pipeline.

Figure 5C:
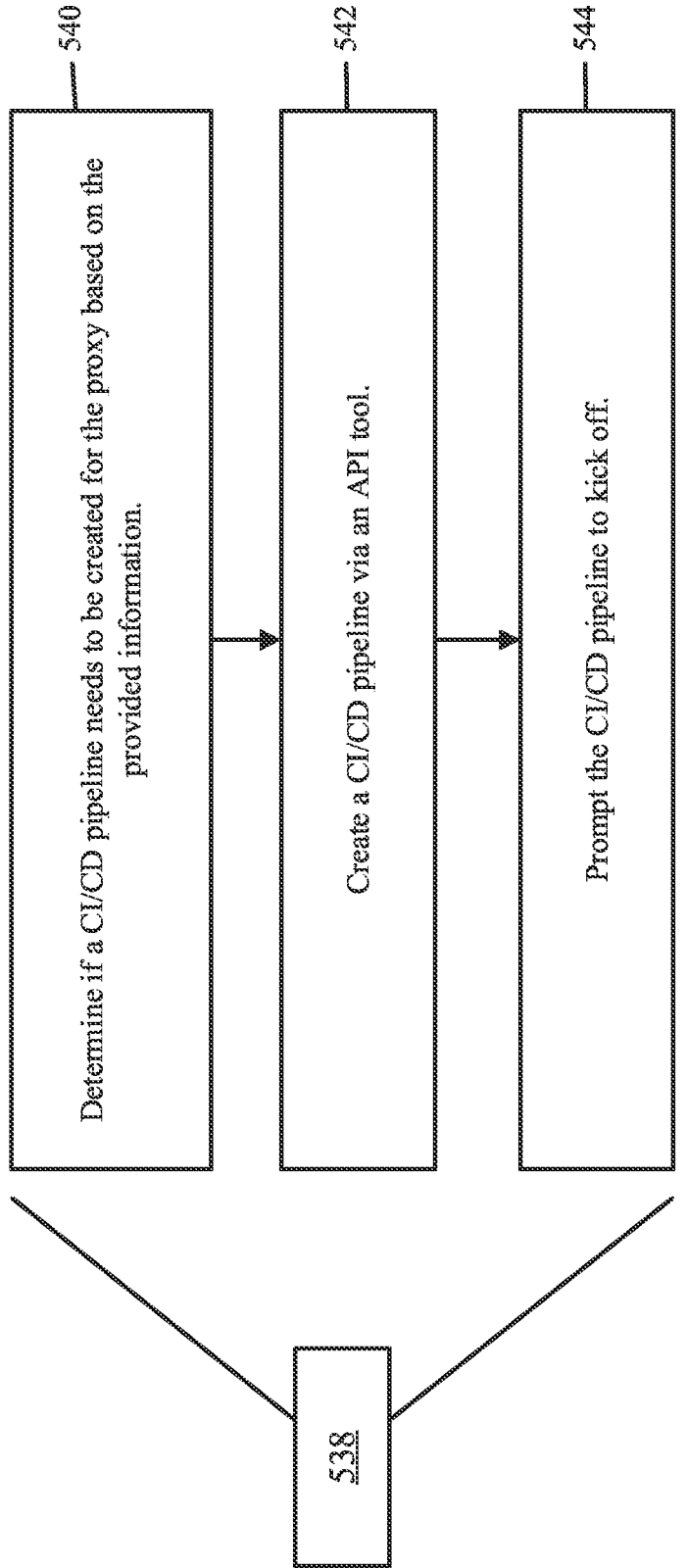
FIG. 5C demonstrates exemplary steps to facilitate the step of implementing a CI/CD pipeline as shown in block 538 of FIG. 5B.

FIG. 5C demonstrates exemplary steps to facilitate the step of implementing a CI/CD pipeline as shown in block 538 of FIG. 5B.

At block 540, the API Forge Accelerator 110 determines if a CI/CD pipeline needs to be created for the proxy based on the provided information. For example, the API Forge Accelerator 110 may look for existing pipelines for the proxy. Based on the search results yielding at least one existing pipeline, the API Forge Accelerator may determine not to create a CI/CD pipeline for the proxy. However, if no pipelines are found, the API Forge Accelerator may determine to create a new pipeline for the proxy.

At block 542, the API Forge Accelerator 110 creates a CI/CD pipeline via an API tool. For instance, the API tool may provide JAVA service integration.

At block 544, the API Forge Accelerator 110 prompts the CI/CD pipeline to kick off. For instance, the API Forge Accelerator 110 may call an API tool (e.g., JENKINS) to kick off the CI/CD pipeline.

FIGS. 5D-5E demonstrate an exemplary process 550 for developing APIs in accordance with one or more examples of the present application. This process 550 provides additional insights from both the user (e.g., an API developer) and application (e.g., the API Forge Accelerator 110), to supplement the blocks described in process 500 or 520, and provide an example of creating a new API.

The API Forge Accelerator 110 (referred to as Application) includes a frontend application 310 and a backend application 320, wherein the frontend application 310 includes a UI that is implemented in a user device 104.

At block 552, an API developer selects API gateway(s) that they would like to use for proxy generation via UI. Based on the selection by the API developer, Application may create API artifacts specific for the selected gateway.

At block 554, UI provides gateway-specific form(s) for the API developer to fill out with their proxy's information. The gateway-specific form(s) is specific to the selected gateway. In some instances, a gateway-specific form may include API artifacts specifically created for the selected gateway.

At block 556, API developer provides OPEN API specification to Application via URL input. Application requires an OPEN API specification (OAS) as a primary input for creating an API. The specification defines operations that the API is capable of performing and the request and response formats for each of these operations. The OPEN API specification conforms to the API governance standards irrespective of the underlying gateway that the API may be deployed. All API specifications may be stored in an API specification repository tool, such as SWAGGERHUB.

At block 558, Application fetches specification information via provided URL using suitable API tools (e.g., SWAGGERHUB). This step might fail if the API developer has provided an incorrect URL or if the OAS data is saved incorrectly. The API developer will be prompted with an error message if this step fails and do the course correction accordingly.

At block 560, Application checks via OAS BUDDY run to ensure that all design guidelines are being followed. If this check fails, it means that the API Standards are not met, and the necessary corrective action needs to be taken. The API developer is informed about these corrective actions on the UI.

At block 562, Application populates UI form options based off gateway-specific needs (e.g., target servers, environments, etc.). The OAS Data may include metadata indicating the specific security scheme (e.g., APIK-KEY, OAUTH) that the API needs to implement. When presented with multiple templates for a security scheme, the API developer may choose one from the options provided to proceed. The list of target servers defines the backends to which the API gateway will route API traffic. This list is saved in the Application database (e.g., the database 330 as shown in FIG. 3A).

At block 564, API developer completes proxy information via UI form by entering additional details. For instance, the API developer may have the option to furnish various details, such as custom backend headers in the request using the gateway, a roster of API developers requiring access to the GIT code repositories, a list of API developers responsible for authorizing the API build and deployment pipeline, and other pertinent information.

At block 566, Application determines if a GIT repository (e.g., GITLAB or GITHUB) needs to be created for this proxy based on the provided information.

At block 568, GIT repository is created via JAVA service integration if needed. The application may coordinate with suitable API tools to create the GIT repository.

At block 570, the UI forms are submitted to backend/database.

At block 572. Application stores the proxy configuration in database as JSON. The form data is saved to the database through the backend application. The saved data includes the distinct API developer inputs selected by the API developer through the UI, along with supplementary static information returned by the Application.

At block 574, Application creates the API source code using preexisting standard template design. The source code may include BDD test cases, scripts for doing integration/mock testing and/or penetration testing, configurations for the CI/CD pipeline, and other pertinent information.

At block 576, Application pushes codebase changes for proxy to source control (e.g., GIT). The Application may push the source code from an application server (that hosts the specific API tool for source code generation) to a version control system (that tracks and manages changes to source code and other relevant files). When an API undergoes an update, the source code is regenerated and pushed to the version control system, such as GITLAB, potentially overwriting any existing changes.

At block 578, Application determines if a CI/CD pipeline (e.g., JENKINS) needs to be created for the proxy based on the provided information.

At block 580, Application creates a CI/CD pipeline via JAVA service integration.

At block 582, Application prompts the CI/CD pipeline to kick off (e.g., JENKINS). For instance, a CI/CD pipeline may execute and perform the following steps. First, with respect to the source code generated in block 574, the CI/CD pipeline may retrieve the source code from the version control system (VCS), execute build scripts to build/package the source code, and perform a code quality check. Then, the CI/CD pipeline may conduct a static code analysis using a SAST external tool, save the packaged code to an artifact repository (e.g., NEXUS), deploy the code to the API gateway selected by the API developer, perform integration testing, deploy the code to additional environments, and perform penetration testing. Should any of the previously outlined steps encounter an error, the pipeline may result in failure, requiring the API developer to remediate the issue before proceeding to next step.

FIG. 6 is an exemplary process 600 for entity visualizer in accordance with one or more examples of the present application. The process 600 may be performed by the enterprise API management platform 108 (the platform 108) and more specifically the API Forge Accelerator 110 of environment 100 shown in FIG. 1. However, it will be recognized that the process 600 may be performed in any suitable environment and that any of the following blocks may be performed in any suitable order. The descriptions, illustrations, and processes of FIG. 6 are merely exemplary and the process 600, the platform 108, and/or the API Forge Accelerator 110 may use other descriptions, illustrations, and processes for managing APIs.

For instance, when an API developer (e.g., an end user 102) wants to examine dependencies among proxies, shared flows, target servers, and backend URL, the API developer may submit a request to the API Forge Accelerator 110 to initiate the process 600. This information may be critical to perform impact analysis if there is a change in any of these components. The interdependencies of these components may get complicated. This feature on API Forge enables the API developer to examine those dependencies before making a change and understand the regression effort that might be needed to thoroughly test the change.

At block 602, the API Forge Accelerator 110 receives, from the user, a query to understand the relationship between two entities like proxies, shared flows, target servers, and backend URL. The API Forge Accelerator 110 may receive the information from the frontend application 310 through UI.

At block 604, the API Forge Accelerator 110 makes a call to a code search and intelligence tool (e.g., SOURCE-GRAPH) to determine the dependencies among proxies, shared flows, target servers, and backend URL. For instance, the API Forge Accelerator 110 may post request to JAVA SPRINGBOOT service through the backend application 320 based on the information obtained from the frontend application 310 through UI. The API tool may be a code search and code intelligence tool, such as SOURCEGRAPH, that semantically indexes and analyzes large codebases (e.g., GIT) so that they can be searched.

At block 606, the API Forge Accelerator 110 receives from the code search tool, results of the dependencies among proxies, shared flows, target servers, and backend URL.

At block 608, the API Forge Accelerator 110 generates, based on the results, a mapping/relationship diagram on a UI. The results returned by the previous step may be in JSON format, which may be processed and rendered as a relationship diagram on the UI in a pictorial form, such as an image format like Scalable Vector Graphics (SVG).

FIG. 7 is an exemplary process for configuring rate limiting in accordance with one or more examples of the present application. The process 700 may be performed by the enterprise API management platform 108 (the platform 108) and more specifically the API Forge Accelerator 110 of environment 100 shown in FIG. 1. However, it will be recognized that the process 700 may be performed in any suitable environment and that any of the following blocks may be performed in any suitable order. The descriptions, illustrations, and processes of FIG. 7 are merely exemplary and the process 700, the platform 108, and/or the API Forge Accelerator 110 may use other descriptions, illustrations, and processes for managing APIs.

Rate Limit protects an API proxy and backend systems against unexpected spikes in API traffic or a Distributed Denial-of-Service (DDOS) attack. In some examples, the API Forge Accelerator 110 may set a default value (e.g., 25 requests per second) when creating a new proxy. However, this feature allows the developer to modify this limit using self-service options.

At block 702, the API Forge Accelerator 110 receives a request from an end user to modify a value related to rate limiting for a proxy. The value relate to rate limiting may be a SpikeArrest value. The request may include a non-production environment to reflect the SpikeArrest value and a numeric value (e.g., between 25 and 10,000) for the Spike-Arrest. The proxy may be queried by searching for the proxy name.

The API Forge Accelerator 110 may receive the request through the frontend application 310 and posts a form(s) to JAVA SPRINGBOOT Service on the backend application 320.

At block 704, the API Forge Accelerator 110 processes the request and updates the configuration in VCS (e.g., a GIT repository).

At block 706, the API Forge Accelerator 110 may decide to run a CI/CD pipeline to automatically sense and deploy the change of the value to a corresponding API gateway. For instance, the API Forge Accelerator 110 may kick off a Jenkins pipeline to 'sense' the change in VCS and deploy the new value of rate-limit to the corresponding API gateway. The pipeline may also clear up the cache on API Gateway configurations so that the modified value of rate-limit is immediately available to the proxy at run time.

At block 708, the API Forge Accelerator 110 returns a success message and display the message on the user device.

A number of implementations have been described. Nevertheless, it will be understood that additional modifications may be made without departing from the scope of the inventive concepts described herein, and, accordingly, other examples are within the scope of the following claims. For example, it will be appreciated that the examples of the application described herein are merely exemplary. Variations of these examples may become apparent to those of ordinary skill in the art upon reading the foregoing description. The inventor expects skilled artisans to employ such variations as appropriate, and the inventor intends for the application to be practiced otherwise than as specifically described herein. Accordingly, this application includes all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

It will further be appreciated by those of skill in the art that the execution of the various machine-implemented processes and steps described herein may occur via the computerized execution of processor-executable instructions stored on a non-transitory computer-readable medium, e.g., random access memory (RAM), read-only memory (ROM), programmable read-only memory (PROM), volatile, nonvolatile, or other electronic memory mechanism. Thus, for example, the operations described herein as being performed by computing devices and/or components thereof may be carried out by according to processor-executable instructions and/or installed applications corresponding to software, firmware, and/or computer hardware.

The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising." "having." "including." and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the application and does not pose a limitation on the scope of the application unless otherwise claimed. No language in the specification should be construed as indicating any non-claimed element as essential to the practice of the application.

The invention claimed is:

1. A method for developing an application programming interface (API), by a computing system running an API Forge Accelerator, comprising:

receiving, by the API Forge Accelerator, a request for generating an API for a service based on a type of a first gateway, wherein the request indicates a selection of the first gateway among a plurality of gateways integrated with the API Forge Accelerator;

generating, by the API Forge Accelerator and based on a specific gateway, a specification template corresponding to the specific gateway for generating the API, wherein the specification template indicates specification information that is used for the API generation;

obtaining, by the API Forge Accelerator and based on the specification template, the specification information from user input and API tools; and generating, by the API Forge Accelerator and based on the specification information, the API for the service.

2. The method of claim 1, wherein obtaining the specification information from the user input and the API tools further comprises:

obtaining, by the API Forge Accelerator, a uniform resource locator (URL) to a specification corresponding to the API, wherein the specification defines operations and formats corresponding to the API; and obtaining, by the API Forge Accelerator via the URL, the specification corresponding to the API using a first API tool among the API tools.

3. The method of claim 1, further comprises:

verifying, by the API Forge Accelerator, that design guidelines are being followed.

4. The method of claim 3, further comprising:

displaying, by the API Forge Accelerator and based on determining that the verification fails, one or more corrective actions on a user device.

5. The method of claim 1, wherein the specification template includes one or more user interface (UI) forms indicating the specification information needed for the API generation, and wherein obtaining the specification information from the user input and the API tools further comprises:

obtaining, by the API Forge Accelerator, the specification information requested by the one or more UI forms corresponding to the specific gateway via the user input and information obtained from the API tools.

6. The method of claim 5, wherein the one or more UI forms further indicates information needed for creating one or more API artifacts for the API.

7. The method of claim 6, wherein generating the API for the service further comprises:

generating, by the API Forge Accelerator, documentations for the one or more API artifacts corresponding to the specific gateway.

8. The method of claim 1, wherein generating the API for the service further comprises:

generating, by the API Forge Accelerator and using one or more API tools among the API tools, source code for the API in accordance with predefined standard template design; and updating, by the API Forge Accelerator and based on the generated source code, corresponding source codes associated with the API in a version control system (VCS).

9. The method of claim 1, further comprising:

determining, by the API Forge Accelerator, whether a continuous integration/continuous deployment (CI/CD) pipeline exists for the API; and creating, by the API Forge Accelerator, the CI/CD pipeline, based on determining that there is no existing CI/CD pipeline for the API.

10. The method of claim 9, further comprising:

prompting, by the API Forge Accelerator, the CI/CD pipeline to kick off.

11. The method of claim 10, wherein the CI/CD pipeline comprises operations of:

retrieving source code from a version control system (VCS);

executing build scripts to build/package the source code;

performing a code quality check;

conducting a static code analysis using an external tool;

saving packaged code to an artifact repository;

deploying the code to the specific gateway;

performing integration testing;

deploying the code to additional environments; and performing penetration testing.

12. The method of claim 11, wherein based on any of the operations by the CI/CD pipeline failing, the API Forge Accelerator notifies the failure and proceeds to a next operation after the failure is fixed.

13. The method of claim 1, further comprising:

receiving, by the API Forge Accelerator, a second request from a user device to modify a value for a proxy associated with the API;

updating, by the API Forge Accelerator, based on the second request, configuration of the proxy in a VCS to modify the value;

running, by the API Forge Accelerator, a CI/CD pipeline to automatically sense and deploy the modification of the value to the specific gateway; and returning, by the API Forge Accelerator, a success message and displaying the message on the user device.

14. The method of claim 1, further comprising:

receiving, by the API Forge Accelerator, a query to inspect relationship between two entities among proxies, shared flows, target servers, and backend uniform resource locator (URL) associated with the API;

calling, by the API Forge Accelerator, to a code search tool to determine dependencies among the proxies, shared flows, target servers, and backend URL associated with the API;

receiving, by the API Forge Accelerator, results of the dependencies among the proxies, shared flows, target servers, and backend URL associated with the API; and generating, by the API Forge Accelerator and based on the results, a relationship diagram on a user device.

15. The method of claim 1, further comprising:

providing, by the API Forge Accelerator and to a user device, sample codes to build a test suite using one or more testing frameworks.

16. An application programming interface (API) Forge Accelerator computing system, comprising:

one or more processors; and a non-transitory computer-readable medium having processor-executable instructions stored thereon, wherein the processor-executable instructions, when executed by the one or more processors, facilitate:

receiving a request for generating an API for a service based on a type of a first gateway, wherein the request indicates a selection of the first gateway among a plurality of gateways integrated with the API Forge Accelerator;

generating, based on a specific gateway, a specification template corresponding to the specific gateway for generating the API, wherein the specification template indicates specification information that is used for the API generation;

obtaining, based on the specification template, the specification information from user input and API tools; and generating, based on the specification information, the API for the service.

17. The API Forge Accelerator computing system of claim 16, wherein the processor-executable instructions, when executed, further facilitate:

receiving a second request from a user device to modify a value for a proxy associated with the API;

updating, based on the second request, configuration of the proxy in a source control system (VCS) to modify the value;

running, a continuous integration/continuous deployment (CI/CD) pipeline to automatically sense and deploy the modification of the value to the specific gateway; and returning, a success message and displaying the message on the user device.

18. The API Forge Accelerator computing system of claim 16, wherein the processor-executable instructions, when executed, further facilitate:

receiving, a query to inspect relationship between two entities among proxies, shared flows, target servers, and backend uniform resource locator (URL) associated with the API;

calling, to a code search tool to determine dependencies among the proxies, shared flows, target servers, and backend URL associated with the API;

receiving, results of the dependencies among the proxies, shared flows, target servers, and backend URL associated with the API; and generating, based on the results, a relationship diagram on a user device.

19. The API Forge Accelerator computing system of claim 16, wherein the processor-executable instructions, when executed, further facilitate:

providing sample codes to build a test suite using one or more testing frameworks.

20. A non-transitory computer-readable medium having processor-executable instructions stored thereon, wherein the processor-executable instructions, when executed, facilitate:

receiving a request for generating an application programming interface (API) for a service based on a type of a first gateway, wherein the request indicates a selection of the first gateway among a plurality of gateways integrated with an API Forge Accelerator;

generating, based on a specific gateway, a specification template corresponding to the specific gateway for generating the API, wherein the specification template indicates specification information that is used for the API generation;

obtaining, based on the specification template, the specification information from user input and API tools; and generating, based on the specification information, the API for the service.

* * * * *